United States Patent
Hwang

(10) Patent No.: US 10,069,312 B2
(45) Date of Patent: Sep. 4, 2018

(54) CHARGING DISCHARGING APPARATUS FOR SUPER CAPACITOR MODULES

(71) Applicant: AVALUE TECHNOLOGY INC., New Taipei (TW)

(72) Inventor: Bar-Chung Hwang, New Taipei (TW)

(73) Assignee: AVALUE TECHNOLOGY INC., New Taipei (TW)

(*) Notice: Subject to any disclaimer, the term of this patent is extended or adjusted under 35 U.S.C. 154(b) by 45 days.

(21) Appl. No.: 15/472,230

(22) Filed: Mar. 28, 2017

(65) Prior Publication Data

US 2018/0026453 A1    Jan. 25, 2018

Related U.S. Application Data

(63) Continuation-in-part of application No. 15/218,251, filed on Jul. 25, 2016.

(51) Int. Cl.
*H02J 7/00* (2006.01)
*H02J 7/34* (2006.01)

(52) U.S. Cl.
CPC .......... *H02J 7/0019* (2013.01); *H02J 7/0021* (2013.01); *H02J 7/345* (2013.01)

(58) Field of Classification Search
CPC ......... H02J 7/0068; H02J 7/0072; H02J 7/345
See application file for complete search history.

(56) References Cited

U.S. PATENT DOCUMENTS

| | | | | |
|---|---|---|---|---|
| 2007/0279004 A1* | 12/2007 | Wang | .................... | H02J 7/0019 320/128 |
| 2009/0230117 A1* | 9/2009 | Fernando | .............. | A24F 47/008 219/490 |

* cited by examiner

*Primary Examiner* — Drew A Dunn
*Assistant Examiner* — Sailesh Thapa
(74) *Attorney, Agent, or Firm* — Chun-Ming Shih; HDLS IPR Services

(57) ABSTRACT

A charging discharging apparatus is applied to two super capacitor modules. The charging discharging apparatus includes a control unit, a first switch unit, a second switch unit, a third switch unit, a fourth switch unit, a first charging switch unit, a second charging switch unit and a charging unit. When an input power apparatus sends an input power to the charging discharging apparatus, the charging discharging apparatus enters a charging mode, so that the super capacitor module having the lower voltage is charged until the voltages of the two super capacitor modules are equal, and then the two super capacitor modules are charged simultaneously in parallel. When the input power apparatus stops sending the input power to the charging discharging apparatus, the two super capacitor modules discharge in series.

10 Claims, 3 Drawing Sheets

CHARGING DISCHARGING APPARATUS FOR SUPER CAPACITOR MODULES

CROSS-REFERENCE TO RELATED APPLICATIONS

This application is a continuation-in-part application of U.S. application Ser. No. 15/218,251 filed on Jul. 25, 2016, and entitled "CHARGING DISCHARGING APPARATUS FOR SUPER CAPACITOR MODULES". The entire disclosure is incorporated herein by reference.

BACKGROUND OF THE INVENTION

Field of the Invention

The present invention relates to a charging discharging apparatus, and especially relates to a charging discharging apparatus for super capacitor modules.

Description of the Related Art

There are two types of the related art charging discharging apparatuses for super capacitor modules: the related art parallel type charging discharging apparatus and the related art serial type charging discharging apparatus.

The advantage of the related art parallel type charging discharging apparatus is that when the related art parallel type charging discharging apparatus charges a plurality of super capacitor modules, the super capacitor modules are connected to each other in parallel, so that the circuit of the related art parallel type charging discharging apparatus is simple (usually does not need the voltage-boosting circuit). The disadvantage of the related art parallel type charging discharging apparatus is that when the super capacitor modules discharge to the power load apparatus through the related art parallel type charging discharging apparatus, the super capacitor modules are not connected to each other in series, so that the super capacitor modules remain much electricity.

The advantage of the related art serial type charging discharging apparatus is that when the super capacitor modules discharge to the power load apparatus through the related art serial type charging discharging apparatus, the super capacitor modules are connected to each other in series, so that the super capacitor modules do not remain much electricity. The disadvantage of the related art serial type charging discharging apparatus is that when the related art serial type charging discharging apparatus charges the super capacitor modules, the super capacitor modules are connected to each other in series, so that the circuit of the related art serial type charging discharging apparatus is complicated (usually needs the higher input voltage or the voltage-boosting circuit).

Moreover, another disadvantage of the related art parallel type charging discharging apparatus is that when the related art parallel type charging discharging apparatus charges the super capacitor modules, if voltages of the super capacitor modules are not equal (for examples, because the super capacitor modules are aged, or the new super capacitor module replaces the original super capacitor module, or the electrical characteristics of the super capacitor modules are different), the problem of the unsafe charging will be generated easily.

SUMMARY OF THE INVENTION

In order to solve the above-mentioned problems, an object of the present invention is to provide a charging discharging apparatus for super capacitor modules.

In order to achieve the object of the present invention mentioned above, the charging discharging apparatus of the present invention is applied to an input power apparatus, a power load apparatus, a first super capacitor module and a second super capacitor module. A negative terminal of the first super capacitor module is connected to ground. The charging discharging apparatus comprises a control unit, a first switch unit, a second switch unit, a third switch unit, a fourth switch unit, a first charging switch unit, a second charging switch unit and a charging unit. The first switch unit is electrically connected to the control unit, the input power apparatus and the power load apparatus. The second switch unit is electrically connected to the control unit, the power load apparatus, the first switch unit and a positive terminal of the second super capacitor module. The third switch unit is electrically connected to the control unit, a positive terminal of the first super capacitor module and a negative terminal of the second super capacitor module. The fourth switch unit is electrically connected to the control unit, the negative terminal of the second super capacitor module, the third switch unit and ground. The first charging switch unit is electrically connected to the control unit, the positive terminal of the first super capacitor module and the third switch unit. The second charging switch unit is electrically connected to the control unit, the first charging switch unit, the second switch unit and the positive terminal of the second super capacitor module. The charging unit is electrically connected to the control unit, the input power apparatus, the first switch unit, the first charging switch unit and the second charging switch unit. When the input power apparatus sends an input power to the charging discharging apparatus, the charging discharging apparatus enters a charging mode, so that the control unit turns off the second switch unit and the third switch unit, and the control unit controls the first switch unit, the fourth switch unit, the first charging switch unit, the second charging switch unit and the charging unit. When the charging discharging apparatus is in the charging mode, if a voltage of the first super capacitor module is greater than a voltage of the second super capacitor module, the second super capacitor module is charged until the voltage of the second super capacitor module is equal to the voltage of the first super capacitor module. When the charging discharging apparatus is in the charging mode, if the voltage of the first super capacitor module is less than the voltage of the second super capacitor module, the first super capacitor module is charged until the voltage of the first super capacitor module is equal to the voltage of the second super capacitor module. When the charging discharging apparatus is in the charging mode, if the voltage of the first super capacitor module is equal to the voltage of the second super capacitor module, the first super capacitor module is electrically connected to the second super capacitor module in parallel, so that the first super capacitor module and the second super capacitor module are charged simultaneously (namely, at the same time). When the input power apparatus stops sending the input power to the charging discharging apparatus, the charging discharging apparatus enters a discharging mode, so that the control unit turns off the first switch unit, the fourth switch unit, the first charging switch unit, the second charging switch unit and the charging unit, and the control unit turns on the second switch unit and the third switch unit, so that the first super capacitor module is electrically connected to the second super capacitor module in series, so that the first super capacitor module and the second super capacitor module discharge to the power load apparatus through the second switch unit and the third switch unit.

Moreover, in an embodiment, the charging discharging apparatus mentioned above further comprises a super capacitor voltage comparing unit electrically connected to the control unit, the positive terminal of the first super capacitor module, the first charging switch unit, the third switch unit, the positive terminal of the second super capacitor module, the second charging switch unit and the second switch unit. When the charging discharging apparatus is in the charging mode, the control unit controls the super capacitor voltage comparing unit to detect and compare the voltage of the first super capacitor module with the voltage of the second super capacitor module. When the charging discharging apparatus is in the discharging mode, the control unit turns off the super capacitor voltage comparing unit, so that the super capacitor voltage comparing unit stops detecting the voltage of the first super capacitor module and the voltage of the second super capacitor module, and the super capacitor voltage comparing unit stops comparing the voltage of the first super capacitor module with the voltage of the second super capacitor module.

Moreover, in the embodiment, the super capacitor voltage comparing unit comprises a first transistor, a second transistor, a first resistor, a second resistor, a third resistor and a fourth resistor. The first transistor is electrically connected to the control unit and the positive terminal of the first super capacitor module. The second transistor is electrically connected to the control unit and the positive terminal of the second super capacitor module. The first resistor is electrically connected to the first transistor, the second transistor and the positive terminal of the second super capacitor module. The second resistor is electrically connected to the first transistor, the second transistor and the positive terminal of the first super capacitor module. The third resistor is electrically connected to the control unit, the first transistor and ground. The fourth resistor is electrically connected to the control unit, the second transistor and ground.

Moreover, in the embodiment, the charging discharging apparatus mentioned above further comprises an input power detection unit electrically connected to the control unit, the input power apparatus, the first switch unit and the charging unit. When the input power apparatus sends the input power to the charging discharging apparatus, the input power detection unit detects the input power and the input power detection unit informs the control unit that the input power is sent to the charging discharging apparatus, so that the charging discharging apparatus enters the charging mode. When the input power apparatus does not send the input power to the charging discharging apparatus, the input power detection unit does not detect the input power and the input power detection unit informs the control unit that the input power is not sent to the charging discharging apparatus, so that the charging discharging apparatus enters the discharging mode.

Moreover, in the embodiment, the control unit is a microcontroller, a microprocessor or a logic circuit.

Moreover, in the embodiment, the first switch unit is a metal oxide semiconductor field effect transistor or a bipolar junction transistor. The fourth switch unit is a metal oxide semiconductor field effect transistor or a bipolar junction transistor.

Moreover, in the embodiment, the second switch unit is a metal oxide semiconductor field effect transistor or a bipolar junction transistor. The third switch unit is a metal oxide semiconductor field effect transistor or a bipolar junction transistor.

Moreover, in the embodiment, the first charging switch unit is a metal oxide semiconductor field effect transistor or a bipolar junction transistor. The second charging switch unit is a metal oxide semiconductor field effect transistor or a bipolar junction transistor.

Moreover, in the embodiment, the charging unit is a charging circuit.

Moreover, in the embodiment, the input power detection unit is a power detection circuit.

The advantage of the present invention is that the charging discharging apparatus has both the advantages of the charging in parallel and the discharging in series, but the charging discharging apparatus does not have the disadvantages of the discharging in parallel and the charging in series. Moreover, when the charging discharging apparatus is in the charging mode, first the super capacitor module having the lower voltage will be charged until the voltages of the two super capacitor modules are equal, and then the two super capacitor modules are charged simultaneously (namely, at the same time), so that the charging safety is improved.

Please refer to the detailed descriptions and figures of the present invention mentioned below for further understanding the technology, method and effect disclosed by the present invention to achieve the predetermined purpose of the present invention. The purpose, features and characteristics of the present invention can be understood well and in details. However, the figures are only for references and descriptions, but the present invention is not limited by the figures.

DETAILED DESCRIPTION OF THE INVENTION

Please refer to following detailed description and figures for the technical content of the present invention.

Figure 1:
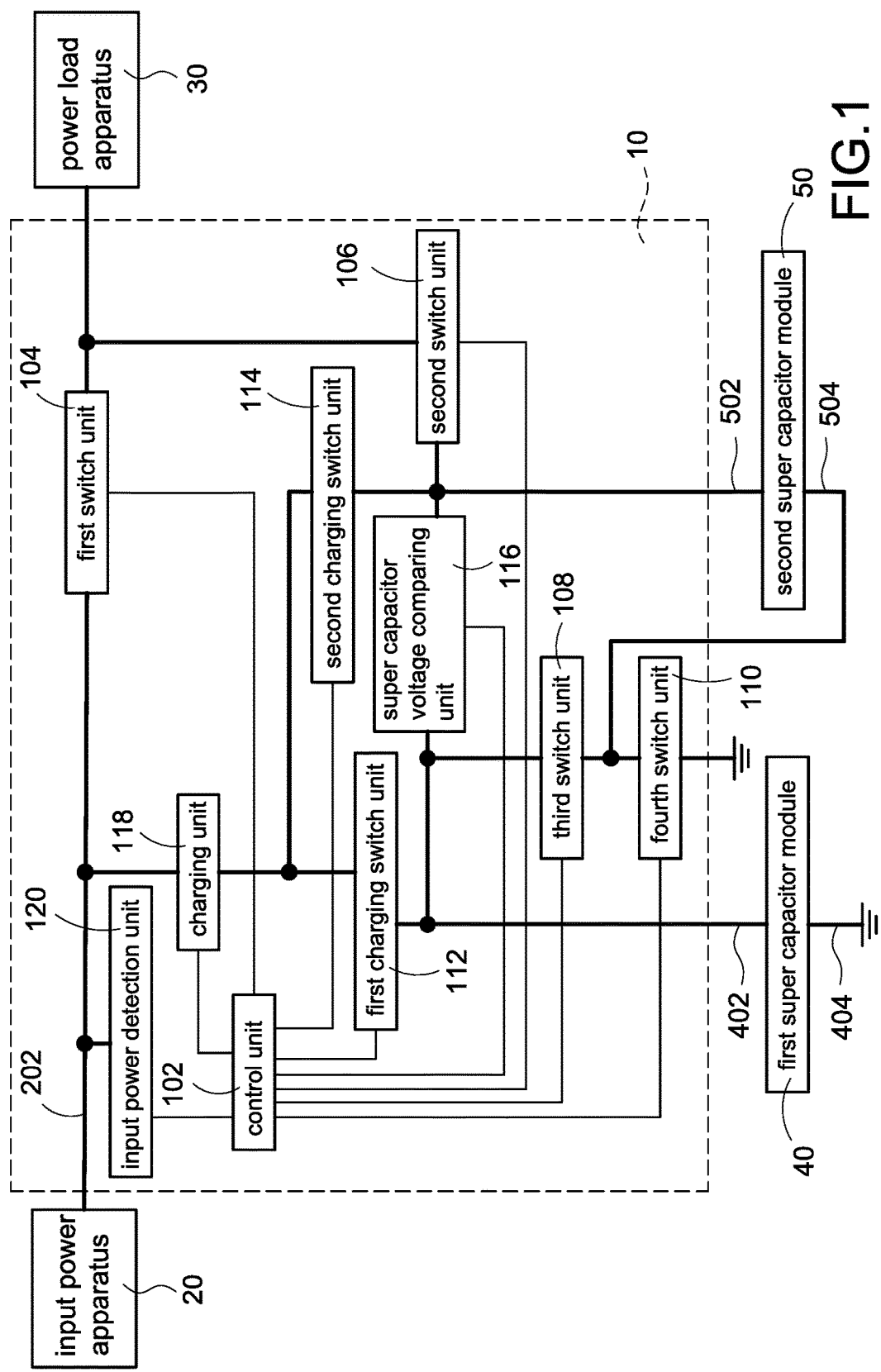
FIG. 1 shows a block diagram of the first embodiment of the charging discharging apparatus of the present invention.

The following content introduces the elements and the connection relationships of the first embodiment of a charging discharging apparatus 10 of the present invention:

FIG. 1 shows a block diagram of the first embodiment of the charging discharging apparatus of the present invention. The charging discharging apparatus 10 of the present invention is applied to an input power apparatus 20, a power load apparatus 30, a first super capacitor module 40 and a second super capacitor module 50. The charging discharging apparatus 10 comprises a control unit 102, a first switch unit 104, a second switch unit 106, a third switch unit 108, a fourth switch unit 110, a first charging switch unit 112, a second charging switch unit 114, a super capacitor voltage comparing unit 116, a charging unit 118 and an input power detection unit 120.

A negative terminal 404 of the first super capacitor module 40 is connected to ground. The first switch unit 104 is electrically connected to the control unit 102, the input power apparatus 20 and the power load apparatus 30. The second switch unit 106 is electrically connected to the control unit 102, the power load apparatus 30, the first switch unit 104 and a positive terminal 502 of the second super capacitor module 50. The third switch unit 108 is electrically connected to the control unit 102, a positive terminal 402 of the first super capacitor module 40 and a negative terminal 504 of the second super capacitor module 50. The fourth switch unit 110 is electrically connected to the control unit 102, the negative terminal 504 of the second super capacitor module 50, the third switch unit 108 and ground. The first charging switch unit 112 is electrically connected to the control unit 102, the positive terminal 402 of the first super capacitor module 40 and the third switch unit 108. The second charging switch unit 114 is electrically connected to the control unit 102, the first charging switch unit 112, the second switch unit 106 and the positive terminal 502 of the second super capacitor module 50. The super capacitor voltage comparing unit 116 is electrically connected to the control unit 102, the positive terminal 402 of the first super capacitor module 40, the first charging switch unit 112, the third switch unit 108, the positive terminal 502 of the second super capacitor module 50, the second charging switch unit 114 and the second switch unit 106. The charging unit 118 is electrically connected to the control unit 102, the input power apparatus 20, the first switch unit 104, the first charging switch unit 112 and the second charging switch unit 114. The input power detection unit 120 is electrically connected to the control unit 102, the input power apparatus 20, the first switch unit 104 and the charging unit 118.

The following content introduces a charging mode of the present invention:

When the input power apparatus 20 sends an input power 202 to the charging discharging apparatus 10, the charging discharging apparatus 10 enters the charging mode, so that the control unit 102 turns off the second switch unit 106 and the third switch unit 108, and the control unit 102 controls the first switch unit 104, the fourth switch unit 110, the first charging switch unit 112, the second charging switch unit 114 and the charging unit 118. In another word, when the charging discharging apparatus 10 is in the charging mode, the control unit 102 turns on the first switch unit 104, so that the power load apparatus 30 receives the input power 202 through the first switch unit 104, and the charging unit 118 receives the input power 202 to charge the first super capacitor module 40 and the second super capacitor module 50.

When the charging discharging apparatus 10 is in the charging mode, if a voltage of the first super capacitor module 40 is greater than a voltage of the second super capacitor module 50, the second super capacitor module 50 is charged until the voltage of the second super capacitor module 50 is equal to the voltage of the first super capacitor module 40. In another word, the control unit 102 turns on the fourth switch unit 110 and the second charging switch unit 114, and the control unit 102 turns off the first charging switch unit 112, so that the charging unit 118 charges the second super capacitor module 50 until the voltage of the second super capacitor module 50 is equal to the voltage of the first super capacitor module 40.

When the charging discharging apparatus 10 is in the charging mode, if the voltage of the first super capacitor module 40 is less than the voltage of the second super capacitor module 50, the first super capacitor module 40 is charged until the voltage of the first super capacitor module 40 is equal to the voltage of the second super capacitor module 50. In another word, the control unit 102 turns on the first charging switch unit 112, and the control unit 102 turns off the second charging switch unit 114, so that the charging unit 118 charges the first super capacitor module 40 until the voltage of the first super capacitor module 40 is equal to the voltage of the second super capacitor module 50.

When the charging discharging apparatus 10 is in the charging mode, if the voltage of the first super capacitor module 40 is equal to the voltage of the second super capacitor module 50, the first super capacitor module 40 is electrically connected to the second super capacitor module 50 in parallel, so that the first super capacitor module 40 and the second super capacitor module 50 are charged simultaneously (namely, at the same time). In another word, the control unit 102 turns on the first charging switch unit 112, the fourth switch unit 110 and the second charging switch unit 114, so that the first super capacitor module 40 and the second super capacitor module 50 are charged simultaneously (namely, at the same time).

In an embodiment, the control unit 102 firstly turns off the second switch unit 106 and the third switch unit 108, and then after a delay time, the control unit 102 just turns on the first switch unit 104, and the control unit 102 just turns on the fourth switch unit 110 and the second charging switch unit 114 (or just turns on the first charging switch unit 112) to avoid the transient short circuit phenomenon.

The following content introduces a discharging mode of the present invention:

When the input power apparatus 20 stops sending the input power 202 to the charging discharging apparatus 10, the charging discharging apparatus 10 enters the discharging mode, so that the control unit 102 turns off the first switch unit 104, the fourth switch unit 110, the first charging switch unit 112, the second charging switch unit 114 and the charging unit 118, and the control unit 102 turns on the second switch unit 106 and the third switch unit 108, so that the first super capacitor module 40 is electrically connected to the second super capacitor module 50 in series, so that the first super capacitor module 40 and the second super capacitor module 50 discharge to the power load apparatus 30 through the second switch unit 106 and the third switch unit 108.

In an embodiment, the control unit 102 firstly turns off the first switch unit 104, the fourth switch unit 110, the second charging switch unit 114 and the first charging switch unit 112, and then after the delay time, the control unit 102 just turns on the second switch unit 106 and the third switch unit 108 to avoid the transient short circuit phenomenon.

The following content introduces the work of the input power detection unit 120 of the present invention:

When the input power apparatus 20 sends the input power 202 to the charging discharging apparatus 10, the input power detection unit 120 detects the input power 202 and the input power detection unit 120 informs the control unit 102 that the input power 202 is sent to the charging discharging apparatus 10, so that the charging discharging apparatus 10 enters the charging mode.

When the input power apparatus 20 does not send the input power 202 to the charging discharging apparatus 10, the input power detection unit 120 does not detect the input power 202 and the input power detection unit 120 informs the control unit 102 that the input power 202 is not sent to the charging discharging apparatus 10, so that the charging discharging apparatus 10 enters the discharging mode.

The following content introduces the work of the super capacitor voltage comparing unit 116 of the present invention:

When the charging discharging apparatus 10 is in the charging mode, the control unit 102 controls the super capacitor voltage comparing unit 116 to detect the voltage of the first super capacitor module 40 and the voltage of the second super capacitor module 50, and then the control unit 102 controls the super capacitor voltage comparing unit 116 to compare the voltage of the first super capacitor module 40 with the voltage of the second super capacitor module 50, so that the control unit 102 is aware that whether the voltage of the first super capacitor module 40 is greater than or less than or equal to the voltage of the second super capacitor module 50. When the charging discharging apparatus 10 is in the discharging mode, the control unit 102 turns off the super capacitor voltage comparing unit 116, so that the super capacitor voltage comparing unit 116 stops detecting the voltage of the first super capacitor module 40 and the voltage of the second super capacitor module 50, and the super capacitor voltage comparing unit 116 stops comparing the voltage of the first super capacitor module 40 with the voltage of the second super capacitor module 50.

Figure 2:
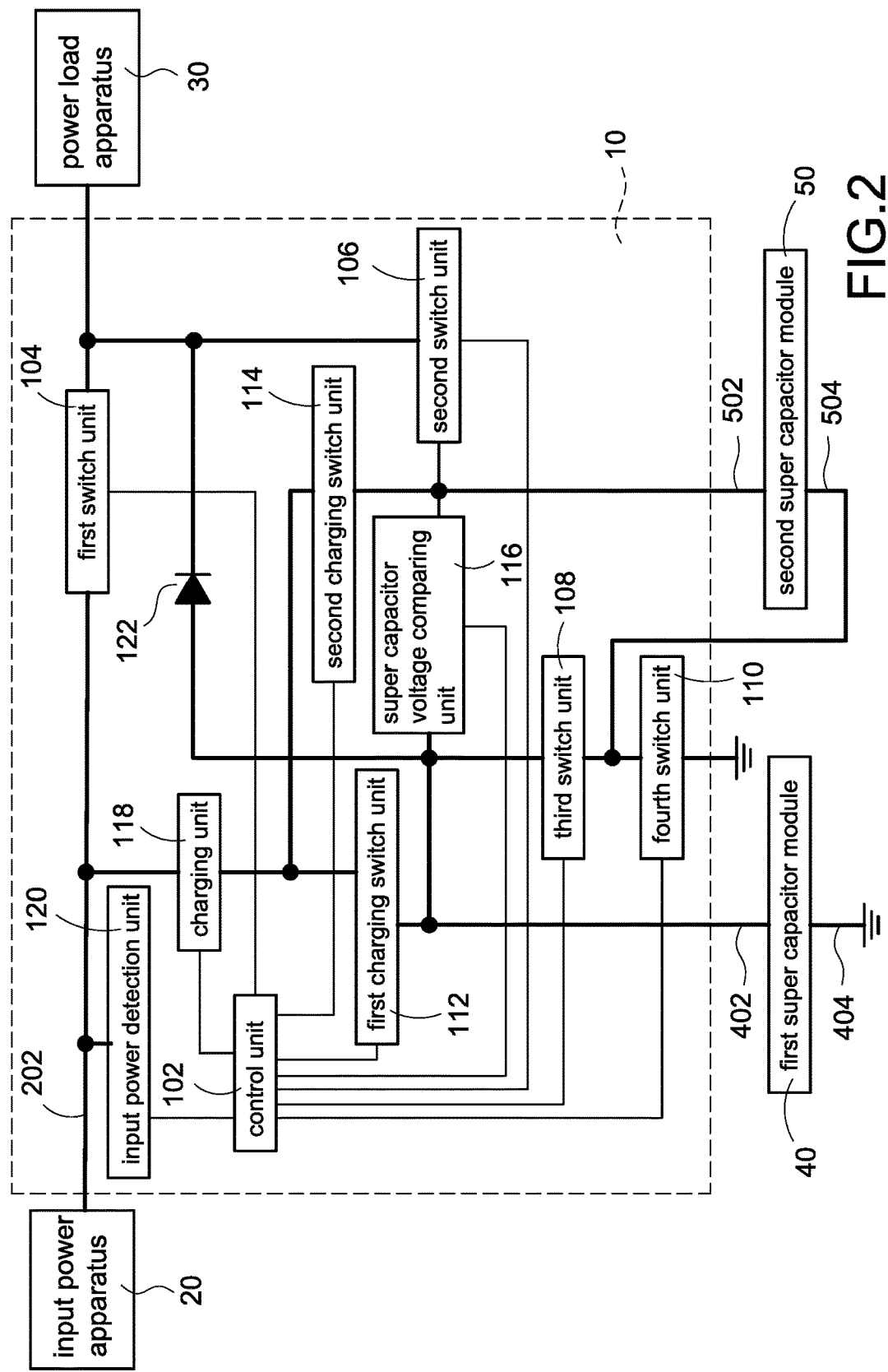
FIG. 2 shows a block diagram of the second embodiment of the charging discharging apparatus of the present invention.

The following content introduces the work of a diode 122 of the second embodiment of the charging discharging apparatus 10 of the present invention:

FIG. 2 shows a block diagram of the second embodiment of the charging discharging apparatus of the present invention. The descriptions of the elements shown in FIG. 2 which are the same as the elements shown in FIG. 1 are not repeated here for brevity. Moreover, the charging discharging apparatus 10 further comprises the diode 122 electrically connected to the first switch unit 104, the power load apparatus 30, the second switch unit 106, the first charging switch unit 112, the positive terminal 402 of the first super capacitor module 40, the third switch unit 108 and the super capacitor voltage comparing unit 116.

In an instant when the input power apparatus 20 stops sending the input power 202 to the charging discharging apparatus 10, the control unit 102 does not turn off the first switch unit 104, the fourth switch unit 110, the first charging switch unit 112 and the second charging switch unit 114 yet (namely, the first switch unit 104, the fourth switch unit 110, the first charging switch unit 112 and the second charging switch unit 114 are still turned on), and the control unit 102 does not turn on the second switch unit 106 and the third switch unit 108 yet (namely, the second switch unit 106 and the third switch unit 108 are still turned off), so that the first super capacitor module 40 and the second super capacitor module 50 are still electrically connected in parallel and discharge to the power load apparatus 30 through the diode 118, so that a voltage of the power load apparatus 30 is just decreased to be a little bit lower than the voltage which is provided by the first super capacitor module 40 and the second super capacitor module 50 which are connected in parallel, so that the power load apparatus 30 can still work without the voltage-dropping problem. Then, once the control unit 102 turns off the first switch unit 104, the fourth switch unit 110, the first charging switch unit 112 and the second charging switch unit 114, and once the control unit 102 turns on the second switch unit 106 and the third switch unit 108, the voltage of the power load apparatus 30 is increased, so that the diode 118 is turned off.

Figure 3:
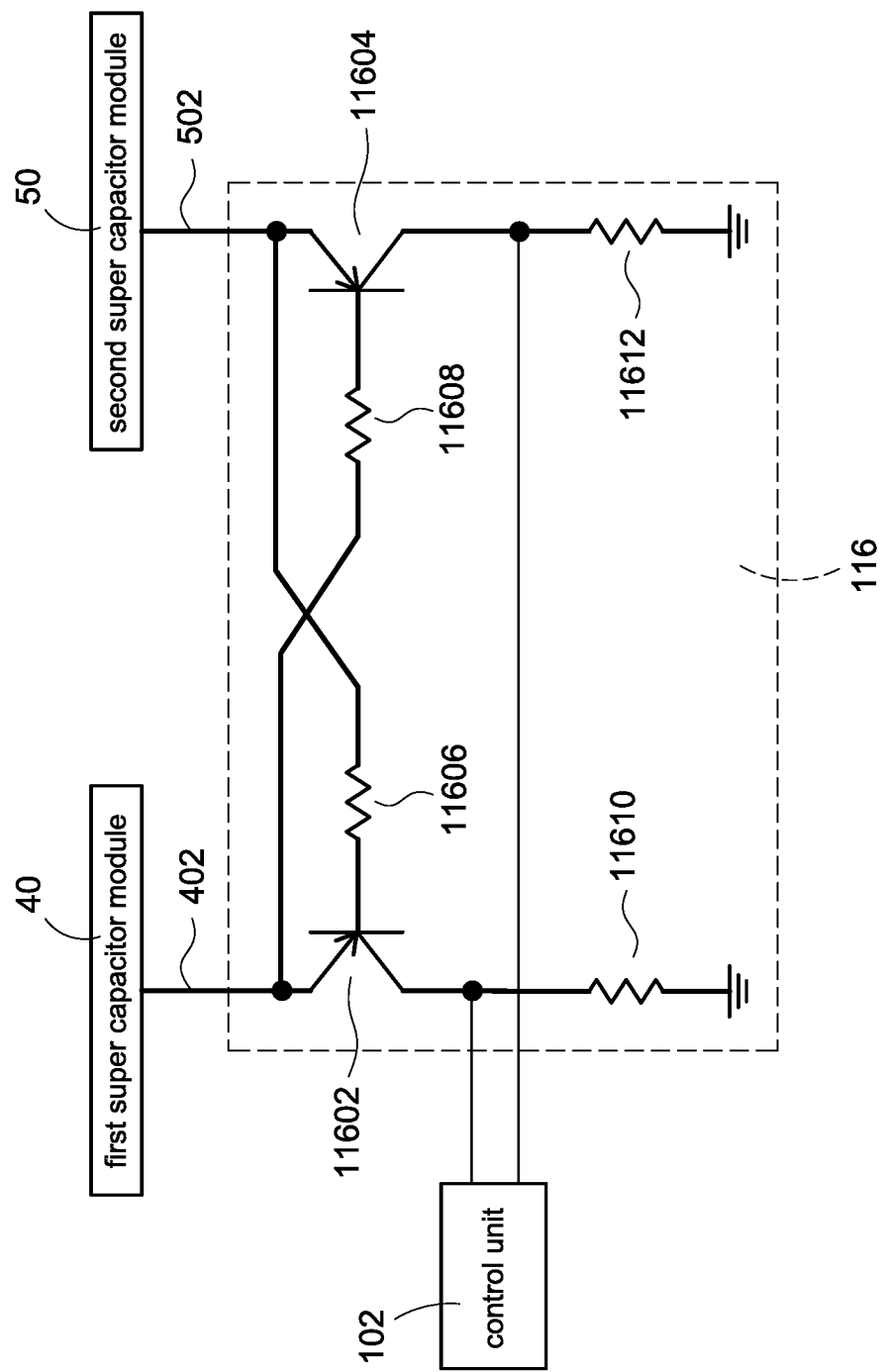
FIG. 3 shows a circuit diagram of an embodiment of the super capacitor voltage comparing unit of the present invention.

The following content introduces the circuit elements and the work of an embodiment of the super capacitor voltage comparing unit 116 of the present invention:

FIG. 3 shows a circuit diagram of an embodiment of the super capacitor voltage comparing unit of the present invention. The super capacitor voltage comparing unit 116 comprises a first transistor 11602, a second transistor 11604, a first resistor 11606, a second resistor 11608, a third resistor 11610 and a fourth resistor 11612. The first transistor 11602 is electrically connected to the control unit 102 and the positive terminal 402 of the first super capacitor module 40. The second transistor 11604 is electrically connected to the control unit 102 and the positive terminal 502 of the second super capacitor module 50. The first resistor 11606 is electrically connected to the first transistor 11602, the second transistor 11604 and the positive terminal 502 of the second super capacitor module 50. The second resistor 11608 is electrically connected to the first transistor 11602, the second transistor 11604 and the positive terminal 402 of the first super capacitor module 40. The third resistor 11610 is electrically connected to the control unit 102, the first transistor 11602 and ground. The fourth resistor 11612 is electrically connected to the control unit 102, the second transistor 11604 and ground.

Moreover, when the charging discharging apparatus 10 is in the charging mode, if the voltage of the first super capacitor module 40 is greater than the voltage of the second super capacitor module 50, an emitter of the first transistor 11602 and a base of the first transistor 11602 form a forward bias voltage so the first transistor 11602 is turned on, so that the third resistor 11610 obtains a first current (namely, the first current flows through the third resistor 11610) so a high level voltage to ground is generated. Oppositely, an emitter of the second transistor 11604 and a base of the second transistor 11604 form a reverse bias voltage so the second transistor 11604 is turned off, so that the fourth resistor 11612 does not obtain a second current (namely, the second current does not flow through the fourth resistor 11612) so a low level voltage to ground is generated. Then the control unit 102 receives a high level signal through a connection point between the first transistor 11602 and the third resistor 11610, and the control unit 102 receives a low level signal through a connection point between the second transistor 11604 and the fourth resistor 11612, so that the control unit 102 is aware that the voltage of the first super capacitor module 40 is greater than the voltage of the second super capacitor module 50. When the charging discharging apparatus 10 is in the charging mode, if the voltage of the second super capacitor module 50 is greater than the voltage of the first super capacitor module 40, the emitter of the second transistor 11604 and the base of the second transistor 11604 form a forward bias voltage so the second transistor 11604 is turned on, so that the fourth resistor 11612 obtains the second current (namely, the second current flows through the fourth resistor 11612) so the high level voltage to ground is generated. Oppositely, the emitter of the first transistor 11602 and the base of the first transistor 11602 form a reverse bias voltage so the first transistor 11602 is turned off, so that the third resistor 11610 does not obtain the first current (namely, the first current does not flow through the third resistor 11610) so the low level voltage to ground is generated. Then the control unit 102 receives the high level signal through the connection point between the second transistor 11604 and the fourth resistor 11612, and the control unit 102 receives the low level signal through the connection point between the first transistor 11602 and the third resistor 11610, so that the control unit 102 is aware that the voltage of the second super capacitor module 50 is greater than the voltage of the first super capacitor module 40. When the charging discharging apparatus 10 is in the charging mode, if the voltage of the first super capacitor module 40 is equal to the voltage of the second super capacitor module 50, the emitter of the first transistor 11602 and the base of the first transistor 11602 cannot form the forward bias voltage so the first transistor 11602 is turned off, and the emitter of the second transistor 11604 and the base of the second transistor 11604 cannot form the forward bias voltage so the second transistor 11604 is turned off either, so that third resistor 11610 does not obtain the first current so the low level voltage to ground is generated, and the fourth resistor 11612 does not obtain the second current so the low level voltage to ground is generated. Then the control unit 102 receives the low level signal through the connection point between the first transistor 11602 and the third resistor 11610, and the control unit 102 receives the low level signal through the connection point between the second transistor 11604 and the fourth resistor 11612, so that the control unit 102 is aware that the voltage of the first super capacitor module 40 is equal to the voltage of the second super capacitor module 50.

The following content introduces the embodiments of the elements of the present invention mentioned above:

The control unit 102 is a microcontroller, a microprocessor or a logic circuit. The response of the logic circuit is faster than the responses of the microcontroller or the microprocessor. The logic circuit can send out conduction signals or non-conduction signals to the first switch unit 104, the second switch unit 106, the third switch unit 108, the fourth switch unit 110, the first charging switch unit 112 and the second charging switch unit 114 in the shortest time.

The first switch unit 104 is a metal oxide semiconductor field effect transistor or a bipolar junction transistor. The fourth switch unit 110 is a metal oxide semiconductor field effect transistor or a bipolar junction transistor. The second switch unit 106 is a metal oxide semiconductor field effect transistor or a bipolar junction transistor. The third switch unit 108 is a metal oxide semiconductor field effect transistor or a bipolar junction transistor. The first charging switch unit 112 is a metal oxide semiconductor field effect transistor or a bipolar junction transistor. The second charging switch unit 114 is a metal oxide semiconductor field effect transistor or a bipolar junction transistor. The charging unit 118 is a charging circuit. The input power detection unit 120 is a power detection circuit.

Finally, the following content introduces the advantage of the present invention:

The advantage of the present invention is that the charging discharging apparatus has both the advantages of the charging in parallel and the discharging in series, but the charging discharging apparatus does not have the disadvantages of the discharging in parallel and the charging in series. Moreover, when the charging discharging apparatus is in the charging mode, first the super capacitor module having the lower voltage will be charged until the voltages of the two super capacitor modules are equal, and then the two super capacitor modules are charged simultaneously (namely, at the same time), so that the charging safety is improved.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A charging discharging apparatus applied to an input power apparatus, a power load apparatus, a first super capacitor module and a second super capacitor module, a negative terminal of the first super capacitor module connected to ground, the charging discharging apparatus comprising:

a control unit;
a first switch unit electrically connected to the control unit, the input power apparatus and the power load apparatus;
a second switch unit electrically connected to the control unit, the power load apparatus, the first switch unit and a positive terminal of the second super capacitor module;
a third switch unit electrically connected to the control unit, a positive terminal of the first super capacitor module and a negative terminal of the second super capacitor module;
a fourth switch unit electrically connected to the control unit, the negative terminal of the second super capacitor module, the third switch unit and ground;
a first charging switch unit electrically connected to the control unit, the positive terminal of the first super capacitor module and the third switch unit;
a second charging switch unit electrically connected to the control unit, the first charging switch unit, the second switch unit and the positive terminal of the second super capacitor module; and
a charging unit electrically connected to the control unit, the input power apparatus, the first switch unit, the first charging switch unit and the second charging switch unit,
wherein when the input power apparatus sends an input power to the charging discharging apparatus, the charging discharging apparatus enters a charging mode, so that the control unit turns off the second switch unit and the third switch unit, and the control unit controls the first switch unit, the fourth switch unit, the first charging switch unit, the second charging switch unit and the charging unit;
wherein when the charging discharging apparatus is in the charging mode, if a voltage of the first super capacitor module is greater than a voltage of the second super capacitor module, the second super capacitor module is charged until the voltage of the second super capacitor module is equal to the voltage of the first super capacitor module;
wherein when the charging discharging apparatus is in the charging mode, if the voltage of the first super capacitor module is less than the voltage of the second super capacitor module, the first super capacitor module is charged until the voltage of the first super capacitor module is equal to the voltage of the second super capacitor module;
wherein when the charging discharging apparatus is in the charging mode, if the voltage of the first super capacitor module is equal to the voltage of the second super capacitor module, the first super capacitor module is electrically connected to the second super capacitor module in parallel, so that the first super capacitor module and the second super capacitor module are charged simultaneously;
wherein when the input power apparatus stops sending the input power to the charging discharging apparatus, the charging discharging apparatus enters a discharging mode, so that the control unit turns off the first switch unit, the fourth switch unit, the first charging switch unit, the second charging switch unit and the charging unit, and the control unit turns on the second switch unit and the third switch unit, so that the first super capacitor module is electrically connected to the second super capacitor module in series, so that the first super capacitor module and the second super capacitor module discharge to the power load apparatus through the second switch unit and the third switch unit.

2. The charging discharging apparatus in claim 1 further comprising:
a super capacitor voltage comparing unit electrically connected to the control unit, the positive terminal of the first super capacitor module, the first charging switch unit, the third switch unit, the positive terminal of the second super capacitor module, the second charging switch unit and the second switch unit,
wherein when the charging discharging apparatus is in the charging mode, the control unit controls the super capacitor voltage comparing unit to detect the voltage of the first super capacitor module and the voltage of the second super capacitor module, and the control unit controls the super capacitor voltage comparing unit to compare the voltage of the first super capacitor module with the voltage of the second super capacitor module; when the charging discharging apparatus is in the discharging mode, the control unit turns off the super capacitor voltage comparing unit, so that the super capacitor voltage comparing unit stops detecting the voltage of the first super capacitor module and the voltage of the second super capacitor module, and the super capacitor voltage comparing unit stops comparing the voltage of the first super capacitor module with the voltage of the second super capacitor module.

3. The charging discharging apparatus in claim 2, wherein the super capacitor voltage comparing unit comprises:
a first transistor electrically connected to the control unit and the positive terminal of the first super capacitor module;
a second transistor electrically connected to the control unit and the positive terminal of the second super capacitor module;
a first resistor electrically connected to the first transistor, the second transistor and the positive terminal of the second super capacitor module;
a second resistor electrically connected to the first transistor, the second transistor and the positive terminal of the first super capacitor module;
a third resistor electrically connected to the control unit, the first transistor and ground; and
a fourth resistor electrically connected to the control unit, the second transistor and ground.

4. The charging discharging apparatus in claim 3 further comprising:
an input power detection unit electrically connected to the control unit, the input power apparatus, the first switch unit and the charging unit,
wherein when the input power apparatus sends the input power to the charging discharging apparatus, the input power detection unit detects the input power and the input power detection unit informs the control unit that the input power is sent to the charging discharging apparatus, so that the charging discharging apparatus enters the charging mode;
wherein when the input power apparatus does not send the input power to the charging discharging apparatus, the input power detection unit does not detect the input power and the input power detection unit informs the control unit that the input power is not sent to the charging discharging apparatus, so that the charging discharging apparatus enters the discharging mode.

5. The charging discharging apparatus in claim 4, wherein the control unit is a microcontroller, a microprocessor or a logic circuit.

6. The charging discharging apparatus in claim 5, wherein the first switch unit is a metal oxide semiconductor field effect transistor or a bipolar junction transistor; the fourth switch unit is a metal oxide semiconductor field effect transistor or a bipolar junction transistor.

7. The charging discharging apparatus in claim 6, wherein the second switch unit is a metal oxide semiconductor field effect transistor or a bipolar junction transistor; the third switch unit is a metal oxide semiconductor field effect transistor or a bipolar junction transistor.

8. The charging discharging apparatus in claim 7, wherein the first charging switch unit is a metal oxide semiconductor field effect transistor or a bipolar junction transistor; the second charging switch unit is a metal oxide semiconductor field effect transistor or a bipolar junction transistor.

9. The charging discharging apparatus in claim 8, wherein the charging unit is a charging circuit.

10. The charging discharging apparatus in claim 9, wherein the input power detection unit is a power detection circuit.

* * * * *